United States Patent [19]

Miyake et al.

[11] Patent Number: 6,084,035
[45] Date of Patent: Jul. 4, 2000

[54] WEATHER-RESISTANT RESIN COMPOSITION FOR POWDER COATING

[75] Inventors: Satoru Miyake, Chiyoda-ku; Hisao Ikeda, Funabashi; Toshinari Koda, Funabashi; Motohiko Hidaka, Funabashi, all of Japan

[73] Assignee: Nissan Chemical Industries, Ltd., Tokyo, Japan

[21] Appl. No.: 09/180,199

[22] PCT Filed: May 19, 1997

[86] PCT No.: PCT/JP97/01666

§ 371 Date: Nov. 4, 1998

§ 102(e) Date: Nov. 4, 1998

[87] PCT Pub. No.: WO97/44400

PCT Pub. Date: Nov. 27, 1997

[30] Foreign Application Priority Data

May 20, 1996 [JP] Japan .................................. 8-125111

[51] Int. Cl.$^7$ .............................. C08F 20/00; C08K 5/49
[52] U.S. Cl. ........................... 525/438; 525/437; 524/81; 524/86; 524/87; 524/92; 524/99; 524/115; 524/126; 524/129; 524/155; 524/904; 522/25; 522/26; 522/28; 522/31
[58] Field of Search ..................... 525/437, 438; 524/81, 86, 87, 92, 99, 115, 126, 129, 155, 904; 522/25, 26, 28, 31

[56] References Cited

U.S. PATENT DOCUMENTS 4,390,680  6/1983  Nelson ........................................ 528/97

FOREIGN PATENT DOCUMENTS

| 49-24248 | 3/1974 | Japan . |
|---|---|---|
| 5-295238 | 11/1993 | Japan . |
| 8-325481 | 12/1996 | Japan . |
| 1 266 066 | 3/1972 | United Kingdom . |
| WO 93/04122 | 3/1993 | WIPO . |

*Primary Examiner*—Samuel A. Acquah
*Attorney, Agent, or Firm*—Oliff & Berridge, PLC

[57] ABSTRACT

A resin composition for powder coating, comprising (A) a carboxyl group-containing resin having a number average molecular weight of 1000 to 20000, an acid value of 5 to 200 and a glass transition temperature of 30 to 120° C., (B) bis(β-methylglycidyl)terephthalate of the formula (1):

$$\text{(1)}$$

as a curing agent, and (D) at least one compound selected from the group consisting of amines having the linkage of the formula (2):

$$\text{(2)}$$

in the molecule, a triarylphosphines and onium salts as a ring-opening polymerization inhibitor, the equivalent ratio of (β-methylglycidyl group of the component (B))/(carboxyl group of the component (A)) being 0.5 to 3.0. The composition can give a product of curing excellent in impact resistance, weathering resistance and so on.

16 Claims, No Drawings

WEATHER-RESISTANT RESIN COMPOSITION FOR POWDER COATING

TECHNICAL FIELD

The present invention relates to a resin composition for powder coating, having high impact resistance, weathering resistance and storage stability, containing as main components a carboxyl group-containing resin and bis(β-methylglycidyl)terephthalate as a curing agent, and further containing a ring-opening polymerization inhibitor for effectively inducing a curing reaction of those.

BACKGROUND ART

Conventionally, epoxy resins, polyester resins, polyacrylic resins, polyvinyl chloride resins, polyethylene resins and the like have been used as a resin for powder coating. In recent years, thermosetting resins have been mainly used from the points of physical properties and smoothness of a coating film. However, the thermosetting resins has the defect that where condensation resins are used or blocked isocyanate is used as a curing agent, condensation elimination components, blocking agent, and the like generate as a gas in curing, and bubbles tend to generate in a coating film.

Polyglycidyl compounds having no elimination component in the curing reaction are raised as a preferable curing agent used in a powder coating. However, where general glycidyl compounds, for example, bisphenol-type diglycidyl ether, is used as a curing agent, phenyl-glycidyl ether bond tends to decompose by light or heat. Further, where glycidyl ester, for example, diglycidyl terephthalate, is used as a curing agent, there is a problem of stability to water. Also, where glycidyl amide, for example, triglycidyl isocyanurate, is used as a curing agent, there is still insufficient point because requirement to weathering resistance becomes more severe in recent years.

Further, since the triglycidyl isocyanurate has high crystallinity, its melting point is as high as the range of 100 to 140° C. For this reason, in order to uniformly kneading with a resin containing a carboxyl group, it is necessary to mix at high temperature to a certain extent (temperature approaching to the melting point). However, this triglycidyl isocyanurate has high reactivity, curing reaction of carboxyl group with glycidyl group somewhat proceeds even at a temperature in kneading, flowability (fluidity) slightly decreases when forming a powder coating and baking (when thermosetting), and there is the case that rough surface called orange peel occurs on a coating film surface.

On the other hand, tris(β-methylglycidyl)isocyanurate has a melting point of 70 to 100° C., and there may not occur the foregoing problem. However, as described in Japanese Patent Application Laid-open No. Hei 8-325481, tris(β-methylglycidyl)isocyanurate has extremely high self-polymerization due to ring-opening polymerization, and some self-polymerization occurs even with use of the ring-opening polymerization inhibitor, so that more than stoichiometric tris(β-methylglycidyl)isocyanurate may be required. In this case, hydrophilic characteristic derived from the isocyanurate ring causes water resistance to deteriorate.

On the other hand, as the technique using β-methylglycidyl ester compound, a thermosetting resin composition comprising β-methylglycidyl ester compound and an amine or a polycarboxylic acid are disclosed in British Patent No. 1,266,066.

Japanese Patent Application Laid-open No. Sho 49-24248 discloses the technique of utilizing polyglycidyl ester and/or poly β-methylglycidyl ester of an aromatic polyvalent carboxylic acid having a melting point of 30 to 250° C. including two or more glycidyl ester groups and/or β-methylglycidyl ester groups as a curing agent in a molecule, particularly aiming at a storage of a powder.

International Publication No. WO93/04122 discloses a composition comprising a carboxyl group-containing polyester resin, an epoxy curing agent such as triglycidyl isocyanurate, methyl substituted triglycidyl isocyanurate or diglycidyl terephthalate, and a phosphonium salt catalyst.

DISCLOSURE OF THE INVENTION

The present invention comprises a carboxyl group-containing resin, bis(β-methylglycidyl)terephthalate and a ring-opening polymerization inhibitor. The above-mentioned curing agent can cope with a wide range of carboxyl group-containing resins, and is a useful solid form to the storage (antiblocking property). A coating film having sufficient impact resistance, weathering resistance, and so on is obtained. The problem of weathering resistance possessed by glycidyl ether, glycidyl ester and glycidyl amide compounds which have been conventionally used is solved by the use of bis(β-methylglycidyl)terephthalate. The ring-opening polymerization inhibitor suppresses self-polymerization due to a ring-opening polymerization of bis(β-methylglycidyl)terephthalate and smoothly reacts with a carboxyl group-containing resin.

The present invention provides a resin composition for powder coating, containing the following component (A), component (B) and component (D):

(A) a carboxyl group-containing resin having a number average molecular weight of 1000 to 20000, an acid value of 5 to 200 and a glass transition temperature of 30 to 120° C.;

(B) bis(β-methylglycidyl)terephthalate of the formula (1):

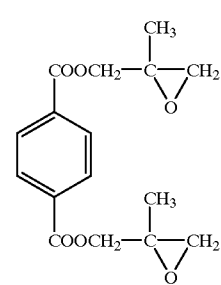

(1)

as a curing agent; and (D) at least one compound selected from the group consisting of amines having the linkage of the formula (2):

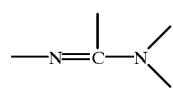

(2)

in the molecule, triarylphosphines and onium salts, as a ring-opening polymerization inhibitor; said resin composition being compounded in the equivalent ratio of (β-methylglycidyl group in the component (B))/(carboxyl group in the component (A)) being 0.5 to 3.0.

The carboxyl group-containing resin of component (A) used in the present invention has a number average molecular weight of 1000 to 20000, and preferably 2000 to 10000, an acid value of 5 to 200 (KOH-mg/g), and preferably 20 to 100 (KOH-mg/g), and a glass transition temperature of 30 to 120° C., and preferably 40 to 80° C. In the present invention, any carboxyl group-containing resin obtained by using known starting materials and methods may be employed so long as those conditions are satisfied. Of those, as the above-mentioned carboxyl group-containing resin, it is preferable to use polyester resins, polyacrylic resins, or mixtures thereof.

In a case that the carboxyl group-containing resin used in the present invention is polyesters, optional polyester resins for a coating, obtained by using well known acids and alcohols, and well known methods, can be used if it is satisfied with the above-mentioned conditions. In this case, acids which can be used include phthalic acid, isophthalic acid, terephthalic acid, methylphthalic acid, trimellitic acid, pyromellitic acid, adipic acid, sebacic acid, succinic acid, maleic acid, fumaric acid, tetrahydrophthalic acid, methyltetrahydrophthalic acid, hexahydrophthalic acid, biphenyldicarboxylic acid, naphthyldicarboxylic acid, and those reactive derivatives such as acid anhydride, acid halide, acid ester and so on. Those can be used alone or by-mixing those. Further, alcohols which can be used include ethylene glycol, propylene glycol, 1,3-butanediol, 1,4-butanediol, 1,6-hexanediol, diethylene glycol, dipropyleneglycol, 1,4-cyclohexane dimethanol, 1,4-cyclohexanediol, biphenyl diol, naphthyl diol, neopentyl glycol, isopentyl glycol, bishydroxyethyl terephthalate, hydrogenated bisphenol A, alkylene oxide adduct of hydrogenated bisphenol A, trimethylol ethane, trimethylol propane, glycerin, pentaerythritol and so on. Those can be used alone or by mixing those. Further, according to the need, for example, reactive polyfunctional compounds such as dimethylol propionic acid, oils and fats, or aliphatic acid can be used as the starting material for the polyester resins. Examples of the reactive polyfunctional compounds include compounds having an acid radical and hydroxyl group in one molecule, such as hydroxypivalic acid or hydroxybenzoic acid. The oils and fats can be introduced by an ester exchange reaction, and the aliphatic acids can be introduced by a dehydration reaction or the like.

The reaction can be conducted by a well known one-stage or multistage reaction. As is well known, the glass transition temperature value is controlled by the selection of kind and amount of the reaction starting materials, and the number average molecular weight and acid value are controlled by the selection of reaction conditions.

On the other hand, where the carboxyl group-containing resin is an acrylic resin, it is obtained by using the conventional starting materials and methods so long as those are satisfied with the above-mentioned conditions.

As the starting material of the acrylic resin, acrylic acid, methacrylic acid and so on are used as the carboxylic group component, and as other component, there are esters of acrylic acid and methacrylic acid, and ethylenically unsaturated compounds, and those are used alone or as mixtures thereof.

The starting materials giving the component (B) include reactive derivatives such as terephthalic acid and the acid halide, acid esters, and so on.

The compounding ratio of the component (A) and the component (B) can be made such that the equivalent ratio of (β-methylglycidyl group in the component (B))/(carboxyl group in the component (A)) is 0.5 to 3.0, preferably 0.7 to 2.5 and more preferably 0.8 to 1.6.

The present invention can further compound a compound containing at least three of glycidyl group, β-methylglycidyl or both groups in one molecule, as a component (C) with the component (A) and component (B). The component (C) can be compounded such that the component (C) is contained in an amount of 1 to 50 parts by weight, preferably 5 to 40 parts by weight, and more preferably 10 to 30 parts by weight, per 100 parts by weight of the component (B), and that the equivalent ratio of (glycidyl group and/or β-methylglycidyl group in the component (B) and the component (C))/(carboxyl group in the component (A)) is 0.5 to 3.0, preferably 0.7 to 2.5 and more preferably 0.8 to 1.6.

The component (C) is a compound containing at least three functional groups of glycidyl group or β-methylglycidyl group or at least three functional groups of glycidyl group and β-methylglycidyl group which are summed, in a molecule.

In the equivalent ratio of the component (A) and the components (B) and (C), β-methylglycidyl group in the component (B) and the component (C) or the functional group of glycidyl group and β-methylglycidyl group in the components (B) and (C) which are summed, can be compounded in the ratio of 0.5 to 3.0 equivalents, preferably 0.7 to 2.5 equivalents and more preferably 0.8 to 1.6 equivalents, per equivalent of the carboxyl group in the component (A).

The component (C) is obtained by reacting a compound containing reactive derivatives such as amines, hydroxyl group, phenol, carboxyl group, acid halides, acid esters and acid anhydrides of carboxyl group, with β-methylepihalogenohydrin. Examples of the above-mentioned compounds include diaminodiphenyl methane, phenylene diamine, pentaerythritol, trihydroxytriphenyl methane, phenol novolac resin, cresol novolac resin, hemimellitic acid, trimellitic acid, trimesic acid, pyromellitic acid, benzophenonetetracarboxylic acid, naphthalenetetracarboxylic acid, isocyanuric acid, tris(carboxymethyl) isocyanurate, and tris(carboxyethyl)isocyanurate.

As the production process, for example, tris(β-methylglycidyl)trimellitate can be synthesized from trimellitic acid or trimellitic anhydride and β-methylepihalogenohydrin by the conventional procedure.

If one example is shown, it can be synthesized from trimellitic acid and β-methylepihalohydrin by the reaction formula mentioned below. In the formula, X is a halogen atom such as chlorine atom or bromine atom.

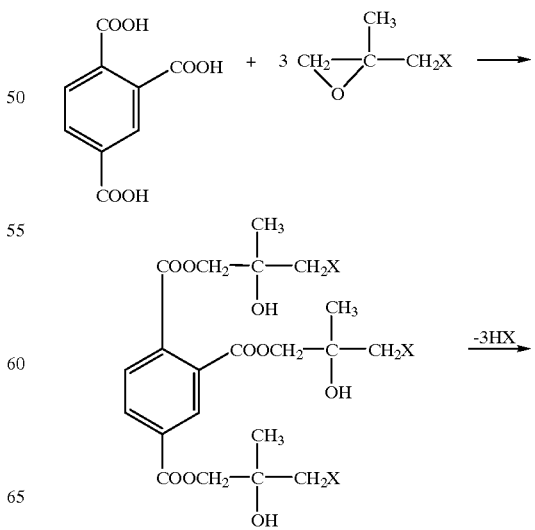

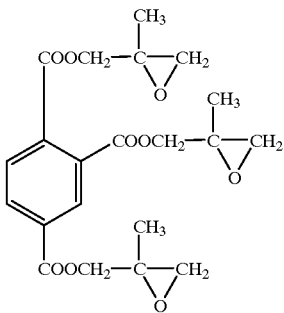

The component (C) is glycidyl and/or β-methyl glycidyl compounds, and examples thereof include glycidyl amine and/or β-methylglycidyl amine derived from amines such as diaminodiphenyl methane or phenylene diamine, glycidyl ether and/or β-methylglycidyl ether derived from ethers or phenols, such as pentaerythritol, trihydroxytriphenyl methane, phenol novolac resin or cresol novolac resin, and glycidyl ester and/or β-methylglycidyl ester derived from polycarboxylic acids such as hemimellitic acid (benzene-1,2,3-tricarboxylic acid), trimellitic acid (benzene-1,2,4-tricarboxylic acid), trimesic acid (benzene-1,3,5-tricarboxylic acid), pyromellitic acid (benzene-1,2,4,5-tetracarboxylic acid) or benzophenonetetracarboxylic acid.

However, the component (C) itself is preferably a compound having excellent weathering resistance. Of the glycidyl and/or β-methyl glycidyl compounds, triglycidyl isocyanurate, tris(β-methylglycidyl)isocyanurate or polyglycidyl and/or poly β-methylglycidyl ester compounds are preferable from that compatibility to the carboxyl group-containing resin, reactivity and weathering resistance are improved.

Examples of the polyglycidyl ester compounds and poly β-methylglycidyl ester compounds include triglycidyl hemimellitate, tris(β-methylglycidyl)hemimellitate, triglycidyl trimellitate, tris(β-methylglycidyl)trimellitate, triglycidyl trimesate, tris(β-methylglycidyl)trimesate, triglycidyl pyromellitate, tris(β-methylglycidyl)pyromellitate, benzophenonetetracarboxylic acid pentaglycidyl ester, benzophenonetetracarboxylic acid penta(β-methylglycidyl) ester, naphthalenetetracarboxylic acid pentaglycidyl ester, or naphthalenetetracarboxylic acid penta(β-methylglycidyl) ester, triglycidyl ester or tris(β-methylglycidyl)ester of tris(carboxymethyl)isocyanurate or tris(carboxyethyl) isocyanurate of the formula (13):

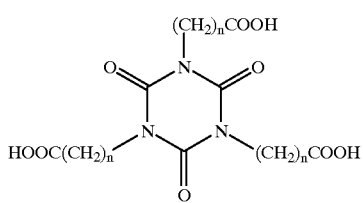

wherein n is an integer of 1 or 2.

Further, those compounds are preferably
tris(β-methylglycidyl)isocyanurate,
tris(β-methylglycidyl)hemimellitate,
tris(β-methylglycidyl)trimellitate,
tris(β-methylglycidyl)trimesate,
tris(β-methylglycidyl)pyromellitate,
benzophenonetetracarboxylic acid penta(β-methylglycidyl) ester,
naphthalenetetracarboxylic acid penta(β-methylglycidyl) ester, or β-methylglycidyl ester compounds typified by tris(β-methylglycidyl)ester of tris(carboxymethyl) isocyanurate or tris(carboxyethyl)isocyanurate of the formula (13) in that the weathering resistance of the coating film obtained is improved.

Of those, in particular tris (β-methylglycidyl)trimellitate is most excellent in compatibility to the carboxyl group-containing resin, reactivity and weathering resistance, and is best as the component (C).

Bis(β-methylglycidyl)terephthalate as the component (B) in the present invention is a solid in the vicinity of room temperature (about 25° C.). Fusing (blocking) of a coating material is difficult to occur, storage stability is excellent, and weathering resistance is also excellent. However, if it is used alone as a curing agent, bis(β-methylglycidyl) terephthalate itself has a low ability for forming crosslinking curability, that is, a network structure. Therefore, in order to impart excellent solvent resistance or impact resistance, the amount of carboxyl group in the carboxyl group-containing resin used is preferably an amount exceeding two on the average in one molecule. However, it has been found that where the carboxyl groups in the carboxyl group-containing resins used is two or slightly exceeds two on the average in one molecule, excellent solvent resistance and impact resistance are imparted by using the component (C).

On the other hand, many β-methyiglycidyl compounds in the component (C) are liquid in the vicinity of room temperature (about 25° C.), and if temperature is set higher than the room temperature in forming a coating material, the coating material tends to fusing (blocking). For the purpose of improving this, a liquid polyglycidyl compound and bis(β-methylglycidyl)terephthalate as the component (B) of the present invention are previously mixed to obtain a non-tacky solid mixture, whereby curing agent having excellent workability can be obtained, as disclosed in Japanese Patent Application Laid-open No. Hei 5-295238. The curability possessed by the trifunctional or more curing agent and antiblocking property possessed by the solid compound are simultaneously imparted.

Further, it has been found that the effect can be obtained even by simultaneously adding an active hydrogen compound containing three or more active hydrogens capable of reacting with β-methylglycidyl ester group of the component (B), per molecule, as a method of improving impact resistance, solvent resistance and so on of the coating film. Active hydrogen includes primary and secondary amines, carboxylic acids, and phenolic hydroxyl group. Examples of the active hydrogen compounds include hexamethylene diamine, diethylene triamine, diaminodiphenylmethane, diaminodiphenylsulfone, isocyanuric acid, cyclohexanetricarboxylic acid, trimellitic acid, pyromellitic acid, and 4,4',4"-trihydroxytriphenylmethane. In this case, the active hydrogen compound can be contained in the ratio of 0.5 to 3.0, preferably 0.7 to 2.5, and more preferably 0.8 to 1.6, in the equivalent ratio of (β-methylglycidyl group in component (B))/(active hydrogen in the active hydrogen compound+carboxyl group in compound (A)). Further, an acid anhydride based on a compound having trifunctional or more carboxylic acid has the same effect, and examples thereof include trimellitic anhydride and pyromellitic dianhydride. Those are calculated that the active hydrogen equivalent is 2.

The present invention can further add component (D) to the component (A) and the component (B), or can further add component (D) to the component (A), the component (B) and the component (C). The component (D) acts as a ring-opening polymerization inhibitor in the composition of the present invention.

The component (D) can be added in the proportion of 0.01 to 10 parts by weight, preferably 0.1 to 5 parts by weight, and most preferably 0.2 to 2 parts by weight, per 100 parts by weight of the component (A).

The component (D) is at least one compound selected from the group consisting of amines having a linkage of the the formula (2):

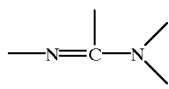

(2)

in the molecule, triarylphosphines and onium salts.

The amines having the linkage of the formula (2) in the molecule of the above-mentioned component (D) include straight chain structures and cyclic structures.

The amines having the linkage of the formula (2) in the molecule are guanidine derivatives having a structure of the formula (4):

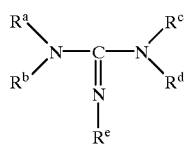

(4)

wherein $R^a$, $R^b$, $R^c$ and $R^d$ represent an alkyl group or an aryl group, and $R^e$ represents hydrogen atom, an alkyl group or an aryl group.

However, the amines having the linkage of the formula (2) in the molecule of the component (D) are more preferably amines of cyclic structure. The cyclic amines having the linkage of the formula (2) in the molecule are, for example, imidazoles and imidazole derivatives. Further, this cyclic amine preferably has the structure of the formula (3):

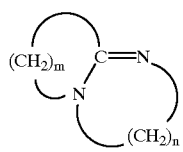

(3)

wherein m is a natural number of 2 to 11, and n is a natural number of 2 to 3. By forming a bicyclic structure like the above, water resistance is improved when a powder resin composition is cured. Amines having the structure of the above-mentioned formula (3) include 1,8-diaza-bicyclo(5,4,0)undecene-7 and 1,5-diaza-bicyclo(4,3,0)nonene-5.

1,8-diaza-bicyclo(5,4,0)undecene-7 is a compound of the following formula (14):

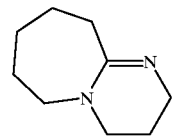

(14)

1,5-diaza-bicyclo(4,3,0)nonene-5 is a compound of the following formula (15):

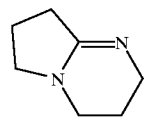

(15)

The triarylphosphines of the above-mentioned component (D) include triphenylphosphine and substituted triphenylphosphines. The substituted triphenylphosphines include tritolylphosphine and tris-methoxyphenylphosphine.

The onium salts of the above-mentioned component (D) include ammonium salts, phophonium salts, arsonium salts, stivonium salts, oxonium salts, sulfonium salts, selenonium salts, stannonium salts and iodonium salts. Further, the onium salts of this component (D) are preferably quaternary ammonium salts having a structure of the formula (5):

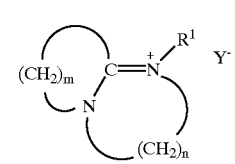

(5)

wherein m is a natural number of 2 to 11, and n is a natural number of 2 to 3, $R^1$ represents an alkyl group or an aryl group, and $Y^-$ represents an anion;

quaternary ammonium salts having a structure of the formula (6): $R^2R^3R^4R^5N^+Y^-$ wherein $R^2$, $R^3$, $R^4$ and $R^5$ represent an alkyl group or an aryl group, N represents nitrogen atom, $Y^-$ represents an anion, and each $R^2$, $R^3$, $R^4$ and $R^5$ are bonded to nitrogen atom through C—N bond;

quaternary ammonium salts having a structure of the formula (7):

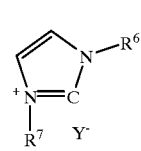

(7)

wherein $R^6$ and $R^7$ represent an alkyl group or an aryl group, and $Y^-$ represents an anion;

quaternary ammonium salts having a structure of the formula (8):

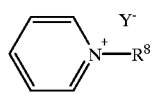

(8)

wherein $R^8$ represents an alkyl group or an aryl group, and $Y^-$ represents an anion;

quaternary ammonium salts having a structure of the formula (9):

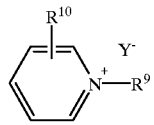

(9)

wherein $R^9$ and $R^{10}$ represent an alkyl group or an aryl group, and $Y^-$ represents an anion;

tertiary ammonium salts having a structure of the formula (10):

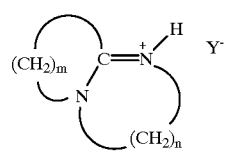

(10)

wherein m is a natural number of 2 to 11, and n is a natural number of 2 to 3, H represents hydrogen atom, and Y-indicates an anion;

quaternary phosphonium salts having a structure of the formula (11): $R^{11}R^{12}R^{13}R^{14}P^+Y^-$ wherein $R^{11}$, $R^{12}$, $R^{13}$ and $R^{14}$ represent an alkyl group or an aryl group, P represents phosphorus atom, $Y^-$ represents an anion, and each $R^{11}$, $R^{12}$, $R^{13}$ and $R^{14}$ are bonded to phosphorus atom through C—P bond, respectively; and tertiary sulfonium salts having a structure of the formula (12): $R^{15}R^{16}R^{17}S^+Y^-$ wherein $R^{15}$, $R^{16}$ and $R^{17}$ represent an alkyl group or an aryl group, $Y^-$ represents an anion, and each $R^{15}$, $R^{16}$ and $R^{17}$ are bonded to sulfur atom through C—S bond.

Selecting those onium salts is preferable in the point of the effect of preventing discoloration of a cured product at high temperature.

The compound of the above-mentioned formula (5) is quaternary ammonium salts derived from amine of the formula (3) wherein m is a natural number of 2 to 11, and n is a natural number of 2 to 3. In particular, quaternary ammonium salts derived from amines of the formula (14) and the formula (15) are preferable. $R^1$ in this quaternary ammonium salt represents an alkyl group or an aryl group having 1 to 18 carbon atoms, and preferably 2 to 10 carbon atoms, and examples thereof include straight-chain alkyl groups such as ethyl group, propyl group or butyl group, benzyl group, cyclohexyl group, cyclohexylmethyl group and dicyclopentadienyl group. Further, the anion ($Y^-$) includes halogen ions such as chlorine ion ($Cl^-$), bromine ion ($Br^-$) or iodine ion ($I^-$), and acid radicals such as carboxylato (—$COO^-$), sulfonato (—$SO_3^-$) or alcoholato (—$O^-$). Compounds having chlorine ion and bromine ion as counter ions are preferable in the point of the effects improving water resistance of the cured product and also preventing discoloration of the cured product at high temperature. The compounds of the formula (5) can be available as commercial products, but can be produced by the reaction of, for example, the compound of the formula (14) or the compound of the formula (15) with an alkyl halide or an aryl halide, such as butyl bromide or benzyl chloride.

The compounds of the above-mentioned formula (6) are quaternary ammonium salts represented by $R^2R^3R^4R^5N^+Y^-$. $R^2$, $R^3$, $R^4$ and $R^5$ of this quaternary ammonium salt are an alkyl group or an aryl group having 1 to 18 carbon atoms. In order to improve water resistance, the sum of carbon number of $R^2$ to $R^5$ is preferably 9 or more, and in order to further improve the water resistance, at least one of alkyl groups or aryl groups in $R^2$, $R^3$, $R^4$ and $R^5$ preferably has the carbon number of 6 to 18. The anion ($Y^-$) includes halogen ions such as chlorine ion ($Cl^-$), bromine ion ($Br^-$) or iodine ion ($I^-$), and acid radicals such as carboxylato (—$COO^-$), sulfonato (—$SO_3^-$) or alcoholato (—$O^-$). Compounds having chlorine ion and bromine ion as counter ions are preferable in the point of the effects improving water resistance of the cured product and also preventing discoloration of the cured product at high temperature. The quaternary ammonium salts of the formula (6) can be available as commercial products, and examples thereof include triethylbenzylammonium chloride, triethylbenzylammonium bromide, trioctylmethylammonium chloride, tributylbenzylammonium chloride and trimethylbenzylammonium chloride.

The compounds of the above-mentioned formula (7) are quaternary ammonium salts derived from 1-substituted imidazole. $R^6$ and $R^7$ have the carbon number of 1 to 18, and the sum of the carbon number of $R^6$ and $R^7$ is preferably 7 or more. Examples of $R^6$ include methyl group, ethyl group, propyl group, phenyl group and benzyl group, and examples of $R^7$ include benzyl group, octyl group and octadecyl group. The anion ($Y^-$) includes halogen ions such as chlorine ion ($Cl^-$), bromine ion ($Br^-$) or iodine ion ($I^-$), and acid radicals such as carboxylato (—$COO^-$), sulfonato (—$SO_3^-$) or alcoholato (—$O^-$). Compounds having chlorine ion and bromine ion as counter ions are preferable in the point of the effects improving water resistance of the cured product and also preventing discoloration of the cured product at high temperature. The compounds of this formula (7) can be available as commercial products, but can be produced by, for example, reacting imidazole compounds such as 1-methylimidazole or 1-benzylimidazole with alkyl halide or aryl halide such as benzyl bromide or methyl bromide.

The compounds of the above-mentioned formula (8) are quaternary ammonium salts derived from pyridine. $R^8$ is an alkyl group or an aryl group having a carbon number of 1 to 18, and preferably a carbon number of 4 to 18, and the examples thereof include butyl group, octyl group, benzyl group and lauryl group. The anion ($Y^-$) includes halogen ions such as chlorine ion ($Cl^-$), bromine ion ($Br^-$) or iodine ion ($I^-$), and acid radicals such as carboxylato (—$COO^-$), sulfonato (—$SO_3^-$) or alcoholato (—$O^-$). Compounds having chlorine ion and bromine ion as counter ions are preferable in the point of the effects improving water resistance of the cured product and also preventing discoloration of this cured product at high temperature. The compounds of this formula (8) can be available as commercial products, but can be produced by, for example, reacting pyridine with alkyl halide or aryl halide, such as lauryl chloride, benzyl chloride, benzyl bromide, methyl bromide or octyl bromide. Examples of the compounds of this formula (8) include N-laurylpyridinium chloride and N-benzylpyridinium bromide.

The compounds of the above-mentioned formula (9) are quaternary ammonium salts derived from substituted pyridines such as picoline. $R^9$ is an alkyl group or an aryl group having a carbon number of 1 to 18, and preferably a carbon number of 4 to 18, and the examples thereof include methyl group, octyl group, lauryl group and benzyl group. $R^{10}$ is an alkyl group or an aryl group having a carbon number of 1 to 18, and for example, in the case of the quaternary ammonium salt derived from picoline, $R^{10}$ is methyl group. The anion ($Y^-$) includes halogen ions such as chlorine ion ($Cl^-$), bromine ion ($Br^-$) or iodine ion ($I^-$), and acid radicals such as carboxylato ($-COO^-$), sulfonato ($-SO_3^-$) or alcoholato ($-O^-$). Compounds having chlorine ion and bromine ion as counter ions are preferable in the point of the effects improving water resistance of the cured product and also preventing discoloration of the cured product at high temperature. The compounds of this formula (9) can be available as commercial products, but can be produced by, for example, reacting substituted pyridine such as picoline with alkyl halide or aryl halide, such as methyl bromide, octyl bromide, lauryl chloride, benzyl chloride or benzyl bromide. Examples of the compounds of this formula (9) include N-benzylpicolinium chloride, N-benzylpicolinium bromide and N-laurylpicolinium chloride.

The compounds of the above-mentioned formula (10) are tertiary ammonium salts derived from amine of the formula (3), wherein m is a natural number of 2 to 11, and n is a natural number of 2 to 3. In particular, the tertiary ammonium salts derived from the formula (14) or the formula (15) are preferable. The anion ($Y^-$) includes halogen ions such as chlorine ion ($Cl^-$), bromine ion ($Br^-$) or iodine ion ($I^-$), and acid radicals such as carboxylato ($-COO^-$), sulfonato ($-SO_3^-$) or alcoholato ($-O^-$). The compounds of the above-mentioned formula (10) can be available as commercial products, but can be produced by, for example, reacting the compound of the formula (14) or the compound of the formula (15) with a weak acid such as carboxylic acid or phenol. Examples of carboxylic acid include formic acid and acetic acid. Where formic acid is used, the anion ($Y^-$) is ($HCOO^-$), and where acetic acid is used, the anion ($Y^-$) is ($CH_3COO^-$). Further, where phenol is used, the anion ($Y^-$) is ($C_6H_5O^-$).

The compounds of the above-mentioned formula (11) are quaternary phosphonium salts having the structure of $R^{11}R^{12}R^{13}R^{14}P^+Y^-$. $R^{11}$, $R^{12}$, $R^{13}$ and $R^{14}$ are an alkyl group or an aryl group having 1 to 18 carbon atoms. Preferably, three of four substituents of $R^{11}$ to $R^{14}$ are phenyl group or substituted phenyl group, and examples thereof include phenyl group or tolyl group. The remaining one is an alkyl group or an aryl group having 1 to 18 carbon atoms. The anion ($Y^-$) includes halogen ions such as chlorine ion ($Cl^-$), bromine ion ($Br^-$) or iodine ion ($I^-$), and acid radicals such as carboxylato ($-COO^-$), sulfonato ($-SO_3^-$) or alcoholato ($-O^-$). Compounds having chlorine ion and bromine ion as counter ions are preferable in the point of the effects improving water resistance of the cured product and also preventing discoloration of the cured product at high temperature. The compounds of the formula (11) can be available as commercial products. Examples thereof include halogenated tetraalkyl phosphoniums such as halogenated tetra n-butyl phosphonium or halogenated tetra n-propyl phosphonium; halogenated trialkylbenzyl phosphoniums such as halogenated triethylbenzyl phosphonium; halogentated triphenylmonoalkyl phosphoniums such as halogenated triphenylmethyl phosphonium or halogenated triphenylethyl phosphonium; halogenated triphenylbenzyl phosphonium; halogenated tetraphenyl phosphonium; halogenated tritolylmonoaryl phosphonium; and halogenated tritolylmonoalkyl phosphonium (halogen atom is chlorine atom or bromine atom). In particular, preferred are halogenated triphenylmonoalkyl phosphoniums such as halogenated triphenylmethyl phosphonium or halogenanted triphenylethyl phosphonium; halogenated triphenylmonoaryl phosphonium such as halogenated triphenylbenzyl phosphonium; halogenated tritolylmonoaryl phosphoniums such as halogenated tritolylmonophenyl phosphonium; and halogenated tritolylmonoalkyl phosphoniums such as halogenated tritolylmonomethyl phosphonium (halogen atom is chlorine atom or bromine atom). In particular, where those are used, it is preferable in the point of the effect of preventing discoloration of the cured product at high temperature.

The compounds of the above-mentioned formula (12) are tertiary sulfonium salts having the structure of $R^{15}R^{16}R^{17}S^+$ $Y^-$. $R^{15}$, $R^{16}$ and $R^{17}$ represent an alkyl group or an aryl group having 1 to 18 carbon atoms. The anion ($Y^-$) includes halogen ions such as chlorine ion ($Cl^-$), bromine ion ($Br^-$) or iodine ion ($I^-$), and acid radicals such as carboxylato ($-COO^-$), sulfonato ($-SO_3^-$) or alcoholato ($-O^-$). Compounds having chlorine ion and bromine ion as counter ions are preferable in the point of the effects improving water resistance of the cured product and also preventing discoloration of the cured product at high temperature. The compounds of the formula (12) can be available as commercial products. Examples thereof include triphenylsulfonium chloride, triphenylsulfonium bromide and tritolylsulfonium chloride.

The component (D) used in the present invention is preferably at least one onium salt selected from the group consisting of the compounds of the formula (5), the compounds of the formula (7), the compounds of the formula (8), the compounds of the formula (9), the compounds of the formula (10), the compounds of the formula (11) and the compounds of the formula (12). By using those onium salts, discoloration does not occur in a coating film obtained by curing the resin composition for powder coating, and also water resistance is further improved, which are preferable.

In particular, it is further preferable from the point of improvement in the water resistance and the effect of preventing discoloration that the component (D) used in the present invention is the compounds of the formula (8), the compounds of the formula (9), the compounds of the formula (11), the compounds of the formula (12), or their mixtures.

Most preferable component (D) used in the present invention is halogenated triphenylmonoalkyl phosphoniums, halogenated triphenylmonoaryl phosphoniums or their mixtures (proviso that halogen atom is chlorine atom or bromine atom). Those onium salts further improve water resistance of a coating film obtained by curing the resin composition for powder coating, and have the most excellent discoloration prevention effect.

A method of adding a certain amount of ring-opening polymerization inhibitor which is the component (D) used in the present invention in the production of a powder coating composition by a conventional procedure includes a first method of melt-mixing the component (D) together with the carboxyl group-containing resin of the component (A) and the curing agent of the component (B), and optionally, pigments or other additives, and a second method of predeterminedly incorporating the component (D) into the carboxyl group-containing resin of the component (A), and melt-mixing the same together with the component (B) or other components. The second method can produce polyester resins in the presence of the component (D) by charging dicarboxylic acid component and glycol component which is a starting material of the component (A), modifying component and polymerization catalyst in a reaction vessel, and simultaneously adding the ring-opening polymerization inhibitor of the component (D). In the second method, where triphenylbenzyl phosphonium bromide, for example, is used as the component (D), triphenyl phosphine and benzyl bromide can be added in the polymerization of a resin of the component (A), thereby conducting polymerization of a resin and simultaneously synthesizing triphenylbenzyl phosphonium bromide. Further, functional groups having a ring-opening polymerization inhibition ability can be incorporated into the structure of resin. In the above-mentioned second method, the compounds of the formula (10) are predeterminedly melt-mixed with the compounds of the formula (14) or (15) and the carboxyl group-containing resin of the component (A), so that the component (A) and the compounds of the formula (14) or (15) are reacted to synthesize the compounds of the formula (10), and as a result, the compounds of the formula (10) can be incorporated into the component (A). However, the compounds of the formula (10) synthesized from the compounds of the formula (14) or (15) in the component (A) partially dissociate into the compounds of the formula (14) or (15) by the heat in melting.

In the present invention, various additives for powder coating composition can be added if desired. Examples of this optional component include acrylic acid alkyl esters as a smoothness improver of a coating film, inorganic pigments such as titanium dioxide and iron oxide and organic pigments such as carbon, phthalocyanine and diazo compound as a coloring pigment, degassing agent, antistatic agents, flame retardants, plasticizers, flowability modifiers, ultraviolet absorbers, and antioxidants.

Preparation of the resin composition for powder coating according to the present invention is conducted in the conventional method. For example, the component (A), the component (B), the component (C), the component (D) and if necessary, optional components are mixed, melt-kneaded at a temperature of 70 to 120° C., cooled, pulverized and sieved to obtain the resin composition. The above-mentioned melt-kneading can be conducted using a general stretched extruder or biaxial extruder, for example, an apparatus such as a Ko-kneader manufactured by Buss Co. Further, as the pulverization, a general dry pulverizer can be used, for example, an apparatus such as hammer mill or jet mill. The pulvelized product obtained is sieved with a classifier of 50 to 200 mesh, preferably 100 to 200 mesh, thereby obtaining the powdery resin composition for powder coating of the present invention.

The resin composition for powder coating of the present invention can be used for substrates such as aluminum, alumite or iron, which had been subjected to general chemical treatment.

The resin composition for powder coating of the present invention is deposited on the substrates by the general electrostatic powder coating method or fluidization coating method, and heated at a temperature of 140 to 230° C. for 10 to 30 minutes to cure, thereby forming a coating film having sufficient impact resistance, weathering resistance and so on. The above-mentioned heating can be conducted by an apparatus such as a circulation hot-air baking oven generally used. By this, a coating film having a thickness of 30 to 300 μm can be formed on the substrate.

The carboxyl group-containing resin of the component (A) used in the present invention is polyester resin or polyacrylic resin. If this resin has a number average molecular weight of less than 1000, film strength is decreased when the coating film is formed, and if it exceeds 20000, flowability is decreased in baking, thereby a smooth coating film is not obtained. If the acid value is less than 5, the carboxyl group content is small, so that it cannot sufficiently be reacted with the curing agent, curability is low, and sufficient coating film strength is not obtained. If it exceeds 200, the crosslinking density becomes high beyond the necessity, and impact resistance is decreased. If the glass transition temperature is 30° C. or less, particles of the powder coating tend to cause fusion (blocking) each other during storage, and if it exceeds 120° C., uniform mixing with the curing agent is difficult in kneading, and also flowability in baking is decreased, making it impossible to obtain the smooth coating film.

It has been found that bis (β-methylglycidyl)-terephthalate which is the component (B) of the present invention is markedly excellent in weathering resistance as compared with diglycidyl terephthalate which is glycidyl ester having the same skeleton, or the like, from the facts that it is excellent in reactivity with carboxyl group due to the influence of electron-withdrawing property originated from ester bond as compared with other β-methylglycidyl compounds, and improves hydrolysis resistance of ester bond formed after curing by electronic and steric effects of methyl group positioned at β-position of glycidyl group.

If other glycidyl and/or β-methylglycidyl compounds are used as the main component of the curing agent, glycidyl and/or β-methylglycidyl amines derived from, for example, diaminodiphenyl methane or phenylene diamine have a problem on weathering resistance due to low stability to light of the compounds obtained, and this is not preferable. Further, glycidyl and/or β-methylglycidyl ethers obtained from pentaerythritol, trihydroxytriphenyl methane, phenol novolac resin or cresol novolac resin has a problem in weathering resistance due to low stability to light of the compounds obtained, and also is not preferable due to extremely poor reactivity to carboxyl group. Further, glycidyl esters known as a compound having high reactivity to carboxyl group has low hydrolysis resistance of ester bond formed after curing, which is not preferable.

According to the present invention, excellent solvent resistance or impact resistance is obtained by adding the component (C) to the component (B). If the component (C) is less than 1 part by weight per 100 parts by weight of the component (B), effect of improving solvent resistance or impact resistance is very low. Further, where the component (C) is liquid state in the vicinity of room temperature by adding the component (C) in an amount exceeding 50 parts by weight, blocking resistance is decreased or weathering resistance of the coating film after curing may be greatly decreased, which is not preferable.

In the component (C), from the fact that β-methylglycidyl compound has excellent reactivity to carboxyl group due to influence of electron-withdrawing property originated from ester bond as compared with the glycidyl compounds, and improves hydrolysis resistance of C—N or ester bond formed after curing by electronic or steric effect of methyl group positioned at β-position of glycidyl group, weathering resistance of the coating film obtained is excellent, which is further preferable.

As β-methylglycidyl esters of the component (C), β-methylglycidyl ester derived from hemimellitic acid, pyromellitic acid, benzophenonetetracarboxylic acid or naphthalenetetracarboxylic acid is poor in hydrolysis resistance due to sufficiently low electron density of carbonyl in ester bond formed after curing, and β-methylglycidyl ester derived from trimesic acid, isocyanuric acid, tris(carboxymethyl)isocyanurate or tris(carboxyethyl)isocyanurate has poor curing reactivity to carboxyl group. From this fact, as the component (C), tris(β-methylglycidyl) trimellitate is the most excellent in compatibility with the carboxyl group-containing resin, reactivity and weathering resistance.

The component (B) or the component (C) used in the present invention has the problem that epoxy ring is ring-opened by the influence of proton ($H^+$) due to the carboxyl group-containing resin, due to the influence of methyl group positioned at β-position of the glycidyl group, and β-methylglycidyl groups are ring-opening polymerized each other. As a result, β-methylglycidyl groups are consumed, and β-methylglycidyl groups which have to be inherently reacted with carboxyl groups are decreased, so that a sufficient coating film may not be obtained. However, it has been found that reaction of β-methylglycidyl groups with each other can be inhibited (ring-opening inhibitor) by adding the above-mentioned component (D).

Further, where the component (D) used in the present invention is a conventionally used general reaction promoter which promotes the reaction between glycidyl group and carboxyl group, such as tertiary amines represented by triethylene amine, or tertiary alkylphosphine represented by tributylphosphine, the ability of ring-opening polymerization inhibition is extremely low, and also a coating film is discolored, which are not preferable. Further, where the component (D) is boron trifluoride, or boron trifluoride complex of, for example, monoethyl amine, monobutyl amine, diethyl ether or the like, ring-opening polymerization is promoted, which is not preferable.

Bis(β-methylglycidyl)terephthalate of the present invention may cause somewhat the problem on curing reactivity by electron donativity and steric hindrance of methyl group positioned at β-position. From such a reason, it is possible to use a curing accelerator. This curing accelerator can generally be any compound so long as it promotes reaction between carboxyl group and glycidyl group. By using the curing accelerator, a coating material can be cured at low temperature for a short period of time.

The present invention can contain the curing accelerator, and it is blended such that the resin composition for powder coating of the present invention does not show cobwebbing at a curing temperature of 140 to 230° C. in use, and time until gelation is about 20 seconds to 30 minutes. The amount of addition thereof is influenced by the desired curing conditions.

BEST MODE OF CARRYING OUT THE INVENTION

The following starting materials were provided.
A1: Carboxyl group-containing polyester resin [a product manufactured by DSM Resin BV., trade name: P-2400, carboxyl equivalent: 1560 g/eq., acid value: 36 (KOH-mg/g), glass transition temperature: about 63° C.]
A2: Carboxyl group-containing polyester resin [carboxyl equivalent: 1130 g/eq., acid value: 49.7 (KOH-mg/g), number average molecular weight: 4520, glass transition temperature: about 75° C.]
A3: Carboxyl group-containing polyester resin [carboxyl equivalent: 2200 g/eq., acid value: 25.5 (KOH-mg/g), number average molecular weight: 4400, glass transition temperature: about 60° C.]
B1: Diglycidyl terephthalate [epoxy equivalent: 154 g/eq.]
B2: Bis(β-methylglycidyl)terephthalate [epoxy equivalent: 163 g/eq.]

C1: Triglycidyl trimellitate [epoxy equivalent: 140 g/eq.]
C2: Tris(β-methylglycidyl)trimellitate [epoxy equivalent: 150 g/eq.]
C3: Triglycidyl isocyanurate [a product manufactured by Nissan Chemical Industries, Ltd., trade name: TEPIC, epoxy equivalent: 105 g/eq.]
C4: Tris(β-methylglycidyl)isocyanurate [epoxy equivalent: 124 g/eq.]
D1: Benzyltriphenylphosphonium bromide [a product manufactured by San-Apro Co., trade name: SA5003]
D2: Tributyl amine [commercially available reagent]
D3: Boron trifluoride monoethyl amine complex [commercially available reagent]
E: Fluidity imparting agent [a product manufactured by Monsanto Chemical Co., trade name: MODAFLOW P-3]
F: Degassing agent [a product manufactured by Wako Pure chemical Industries, Ltd., benzoin]
G: White pigment (main component is titanium oxide) [a product manufactured by Kronos Titan GMBH, trade name: KRONOS 2160]

(Synthesis of carboxyl group-containing polyester resin A2)

100 g of dimethyl terephthalate, 107 g of neopentyl glycol and 0.2 g of zinc acetate were charged in a reactor equipped with a fractioning column and a stirrer. Reaction was conducted under heating while distilling off methanol outside the system. After discharge of methanol was stopped, the reaction product was transferred into a polymerization reactor equipped with a stirrer, replaced with nitrogen. 0.1 g of diantimony trioxide and 0.11 g of trimethyl phosphate were added to conduct normal pressure reaction at 250° C. for 30 minutes, and the reaction was then conducted under a reduced pressure of about 25 mmHg for 30 minutes. 100 g of the resin thus obtained and 10.0 g of trimellitic anhydride were reacted in a polymerization reactor equipped with a stirrer at 180° C. for 30 minutes. The polyester resin obtained had a carboxyl equivalent of 1130 g/eq., an acid value of 49.7 (KOH-mg/g), a number average molecular weight of 4520 and a glass transition temperature of about 75° C.

(Synthesis of carboxyl group-containing polyester resin A3)

100 g of dimethyl terephthalate, 107 g of neopentyl glycol and 0.2 g of zinc acetate were charged in a reactor equipped with a fractioning column and a stirrer. Reaction was conducted under heating while distilling off methanol outside the system. After discharge of methanol was stopped, the reaction product was transferred into a polymerization reactor equipped with a stirrer, replaced with nitrogen. 0.1 g of diantimony trioxide and 0.11 g of trimethyl phosphate were added to conduct normal pressure reaction at 250° C. for 30 minutes, and the reaction was then conducted under a reduced pressure of about 25 mmHg for 30 minutes. 100 g of the resin thus obtained and 7.8 g of cyclohexanedicarboxylic anhydride were reacted in a polymerization reactor equipped with a stirrer at 180° C. for 30 minutes. The polyester resin obtained had a carboxyl equivalent of 2200 g/eq., an acid value of 25.5 (KOH-mg/g), a number average molecular weight of 4400 and a glass transition temperature of about 60° C.

(Synthesis of diglycidyl terephthalate B1)

166 g (1 mole) of terephthalic acid, 1850 g (20 moles) of epichlorohydrin and 3 g of tetramethylammonium chloride were added to a flask having a capacity of 3 liters and equipped with a stirring device, a thermometer, a continuous dropping device and a device which concentrates an azeotropic steam of epichlorohydrin and water under reduced pressure and returns epichlorohydrin only to the reaction system, and stirred at 100° C. for 10 hours. While pressure in the reaction system was reduced to a reduced pressure of 50 mmHg and temperature in the reaction vessel was maintained at 40 to 50° C., the entire amount of 320 g (4 moles) of an aqueous caustic soda solution having 50 wt % concentration was added dropwise over about 3 hours to conduct reaction. During this, water added dropwise and water formed were removed outside the system by subjecting to azeotrope with epichlorohydrin.

After completion of the reaction, the inside of the reaction vessel was cooled to room temperature, and then washed with an aqueous 10% sodium dihydrogenphosphate solution to neutralize caustic soda used in excess amount. Common salt was then removed by water washing, and epichlorohydrin was distilled off at 120° C. under reduced pressure (10 mmHg) to obtain 236 g of diglycidyl terephthalate. Its epoxy equivalent was 154 g/eq., and it was a viscous liquid.

(Synthesis of bis(β-methylglycidyl)terephthalate B2)

166 g (1 mole) of terephthalic acid, 2100 g (20 moles) of β-methyl epichlorohydrin and 3 g of tetramethylammonium chloride were added to a flask having a capacity of 3 liters and equipped with a stirring device, a thermometer, a continuous dropping device and a device which concentrates an azeotropic steam of β-methyl epichlorohydrin and water under reduced pressure and returns β-methyl epichlorohydrin only to the reaction system, and stirred at 100° C. for 10 hours. While pressure in the reaction system was reduced to a reduced pressure of 50 mmHg and temperature in the reaction vessel was maintained at 40 to 50° C., the entire amount of 320 g (4 moles) of an aqueous caustic soda solution having 50 wt % concentration was added dropwise over about 3 hours to conduct reaction. During this, water added dropwise and water formed were removed outside the system by subjecting to azeotrope with β-methyl epichlorohydrin.

After completion of the reaction, the inside of the reaction vessel was cooled to room temperature, and then washed with an aqueous 10% sodium dihydrogenphosphate solution to neutralize caustic soda used in excess amount. Common salt was then removed by water washing, and β-methyl epichlorohydrin was distilled off at 120° C. under reduced pressure (10 mmHg) to obtain 274 g of bis(β-methylglycidyl) terephthalate. Its epoxy equivalent was 163 g/eq., and it was a viscous liquid.

(Synthesis of triglycidyl trimellitate C1)

210 g (1 mole) of trimellitic acid, 1850 g (20 moles) of epichlorohydrin and 3 g of tetramethylammonium chloride were added to a flask having a capacity of 3 liters equipped with a stirring device, a thermometer, a continuous dropping device and a device which concentrates an azeotropic steam of epichlorohydrin and water under reduced pressure and returns epichlorohydrin only to the reaction system, and stirred at 100° C. for 10 hours. While pressure in the reaction system was reduced to a reduced pressure of 50 mmHg and temperature in the reaction vessel was maintained at 40 to 50° C., the entire amount of 320 g (4 moles) of an aqueous caustic soda solution having 50 wt % concentration was added dropwise over about 3 hours to conduct reaction. During this, water added dropwise and water formed were removed outside the system by subjecting to azeotrope with epichlorohydrin.

After completion of the reaction, the inside of the reaction vessel was cooled to room temperature, and then washed with an aqueous 10% sodium dihydrogenphosphate solution to neutralize caustic soda used in excess amount. Common salt was then removed by water washing, and epichlorohydrin was distilled off at 120° C. under reduced pressure (10 mmHg) to obtain 210 g of triglycidyl trimellitate. Its epoxy equivalent was 140 g/eq., and it was a viscous liquid.

(Synthesis of tris(β-methylglycidyl) trimellitate C2)

210 g (1 mole) of trimellitic acid, 2100 g (20 moles) of β-methyl epichlorohydrin and 3 g of tetramethylammonium chloride were added to a flask having a capacity of 3 liters and equipped with a stirring device, a thermometer, a continuous dropping device and a device which concentrates an azeotropic steam of (β-methyl epichlorohydrin and water under reduced pressure and returns (β-methyl epichlorohydrin only to the reaction system, and stirred at 100° C. for 10 hours. While pressure in the reaction system was reduced to a reduced pressure of 50 mmHg and temperature in the reaction vessel was maintained at 40 to 50° C., the entire amount of 320 g (4 moles) of an aqueous caustic soda solution having 50 wt % concentration was added dropwise over about 3 hours to conduct reaction. During this, water added dropwise and water formed were removed outside the system by subjecting to azeotrope with β-methyl epichlorohydrin.

After completion of the reaction, the inside of the reaction vessel was cooled to room temperature, and then washed with an aqueous 10% sodium dihydrogenphosphate solution to neutralize caustic soda used in excess amount. Common salt was then removed by water washing, and β-methyl epichlorohydrin was distilled off at 120° C. under reduced pressure (10 mmHg) to obtain 300 g of tris (β-methylglycidyl)-trimellitate. Its epoxy equivalent was 150 g/eq., and it was a viscous liquid.

EXAMPLE 1

569 g of the carboxyl group-containing polyester resin (A1), 65 g of bis(β-methylglycidyl)terephthalate (B2), 3 g of benzyltriphenylphosphonium bromide (D1), 10 g of a flow modifier (E), 3 g of degassing agent (F) and 350 g of a white pigment (G) were introduced into a kneader, and melt-mixed at temperature of 120° C. Thereafter, the mixture was cooled to room temperature and pulverized with a kitchen mixer. This pulverized product was sieved with a 150 mesh classifier to obtain a resin composition for powder coating. The above-mentioned formulation is shown in Table 1.

EXAMPLE 2 TO EXAMPLE 5

Resin compositions for powder coating were obtained in the same manner as in Example 1 with the same formulation shown in Table 1.

TABLE 1

| Component | Example 1 | Example 2 | Example 3 | Example 4 | Example 5 |
|---|---|---|---|---|---|
| A1 | 569 | — | — | — | — |
| A2 | — | 549 | — | — | — |
| A3 | — | — | 584 | 585 | 584 |
| B1 | — | — | — | — | — |
| B2 | 65 | 87 | 48 | 37 | 38 |
| C1 | — | — | — | 9 | — |
| C2 | — | — | — | — | 9 |
| C3 | — | — | — | — | — |
| C4 | — | — | — | — | — |
| D1 | 3 | 1 | 6 | 6 | 6 |
| D2 | — | — | — | — | — |
| D3 | — | — | — | — | — |
| E | 10 | 10 | 10 | 10 | 10 |
| F | 3 | 3 | 3 | 3 | 3 |
| G | 350 | 350 | 350 | 350 | 350 |

COMPARATIVE EXAMPLE 1

574 g of the carboxyl group-containing polyester resin (A1), 63 g of diglycidyl terephthalate (B1), 10 g of a flow modifier (E), 3 g of degassing agent (F) and 350 g of a while pigment (G) were introduced into a kneader, and melt-mixed at a temperature of 120° C. Thereafter, the mixture was cooled to room temperature, and pulverized with a kitchen mixer. This pulverized product was sieved with a 150 mesh classifier to obtain a resin composition for powder coating. The above formulation is shown in Table 2.

COMPARATIVE EXAMPLE 2 TO COMPARATIVE EXAMPLE 7

Resin compositions for powder coating were obtained in the same manner as in Comparative Example 1 with the formulation shown in Table 2. Further, Reference Example 1 and Reference Example 2 obtained resin compositions for powder coating in the same manner as in Comparative Example 1 with the formulation shown in Table 2.

TABLE 2

| Component | Comparative Example 1 | Comparative Example 2 | Comparative Example 3 | Comparative Example 4 | Comparative Example 5 |
|---|---|---|---|---|---|
| A1 | 574 | 572 | 569 | 592 | 567 |
| A2 | — | — | — | — | — |
| A3 | — | — | — | — | — |
| B1 | 63 | 62 | 65 | — | — |
| B2 | — | — | — | — | — |
| C1 | — | — | — | — | — |
| C2 | — | 3 | — | — | — |
| C3 | — | — | — | 45 | — |
| C4 | — | — | — | — | 67 |
| D1 | — | — | 3 | — | 3 |
| D2 | — | — | — | — | — |
| D3 | — | — | — | — | — |
| E | 10 | 10 | 10 | 10 | 10 |
| F | 3 | 3 | 3 | 3 | 3 |
| G | 350 | 350 | 350 | 350 | 350 |

| Component | Comparative Example 6 | Comparative Example 7 | Reference Example 1 | Reference Example 2 |
|---|---|---|---|---|
| A1 | 569 | 569 | 571 | 572 |
| A2 | — | — | — | — |
| A3 | — | — | — | — |
| B1 | — | — | — | — |
| B2 | 65 | 65 | 66 | 52 |
| C1 | — | — | — | — |
| C2 | — | — | — | 13 |
| C3 | — | — | — | — |
| C4 | — | — | — | — |
| D1 | — | — | — | — |
| D2 | 3 | — | — | — |
| D3 | — | 3 | — | — |
| E | 10 | 10 | 10 | 10 |
| F | 3 | 3 | 3 | 3 |
| G | 350 | 350 | 350 | 350 |

The resin compositions for powder coating of the above-mentioned Examples 1 to 5 and Comparative Examples 1 to 7 were coated on a zinc phosphate-treated steel plate having a thickness of 0.6 mm by an electrostatic spray coating method in a film thickness of 60 $\mu$m. The coating was baked at 180° C. for 20 minutes to obtain a coating film composed of the above-mentioned resin compositions for powder coating.

The performances of those coating films were evaluated by the following test methods.

Test [1]: Impact test (The test was conducted according to test of impact resistance of general test method of coating material, JIS, K-5400). A test piece facing the coating film upwardly is placed between an impulse rod having a constant roundness (½ inch) at the tip and a receiving table fitted into the roundness, and a weight is dropped on to the upper portion to the impulse rod. It is confirmed if the breakage or separation of the film occurs, and impact resistance of the coating film in this case was judged by the maximum impact strength to the extent that breakage or separation of the film does not occur. The strength of impact is adjusted by weight of the weight and distance of drop, and the maximum impact strength is represented by "(weight of the weight)×(distance of drop)". Less than (500 g×10 cm) was designated as r(1), (500 g×10 cm) or more and less than (1 kg×20 cm) was designated as r(2), (1 kg×20 cm) or more and less than (1 kg×50 cm) was designated as r(3) and (1 kg–50 cm) or more was designated as r(4). Impact resistance is increased in the order from r(1) to r(4). Impact tester used was a tester made by Tester Industries Co.

Test [2]: Weathering resistance test (The test was conducted according to ASTM G-53). Test piece was irradiated with UV light of a wavelength of $\lambda$max=340 nm with an energy of 4.0 mW/cm$^2$ at 60° C. for 4 hours. Thereafter, the irradiation was stopped, and the test piece was humidified at 50° C. for 4 hours. This cycle test was conducted for a long period of time, gloss at 60° was measured, and time that retention becomes 50% to the initial gloss (before test) was recorded. The time of less than 2000 hours was evaluated as r(1), the time of 2000 hours or more and less than 2500 hours was evaluated as r(2), the time of 2500 hours or more and less than 3000 hours was evaluated as r(3) and the time of 3000 hours or more was evaluated as r(4). Weathering resistance is increased in the order of from r(1) to r(4). Dew panel light control weather-meter made by Suga Test Instruments Co., Ltd. was used, and gloss meter made by Tester Industries Co. was used for the measurement of gloss.

20 g of each of the resin compositions for powder coating of Examples 1 to 5 and Comparative Examples 1 to 7 were placed on a Teflon plate, and curing reaction was conducted in a circulation hot air oven at 180° C. for 20 minutes. After cooling to room temperature, the test piece was frozen and pulverized up to a particle size of about 100 $\mu$m. This sample was used for the below-mentioned Test [3]: measurement of ring-opening polymerization ratio, and the blow-mentioned Test [4]: discoloration test after heat curing.

Test [3]: Ratio of ring-opening polymerization

If (epoxy value before heat curing of resin composition for powder coating) is (a1), (epoxy value after heat curing of resin composition for powder coating) is (a2) and (reaction consumed epoxy value) is (a3), it is (a1)–(a2)=(a3). This (reaction consumed epoxy value) is an amount of the entire epoxy groups required when the resin composition for powder coating is cured.

Further, if the entire carboxyl groups required when the resin composition for powder coating is cured is represented as (b1) in terms of the reaction consumed carboxyl value, (a3)–(b1) is an amount that epoxy group is not reacted with carboxyl group, and epoxy groups conduct ring-opening polymerization each other, thereby forming a polyether. That is, this (a3)–(b1) is an amount that self-polymerization occured.

When the ratio of ring-opening polymerization is represented by [(a3)–(b1)]÷(a3)×100=(ring-opening polymerization ratio) %, if the ring-opening polymerization ratio is high, it means that self-polymerization occurs much. Therefore, when this ring-opening polymerization ratio is 40% or more, it is designated as r(1), when it is 15% or more and less than 40%, it is designated as r(2) and when it is less than 15%, it is designated as r(3), as is shown in Table 3 and Table 4. Ring-opening polymerization of epoxy groups each other does not occur in the order from r(1) to r(3), and it means that epoxy group and carboxyl group are well efficiently reacted. Quantitative method of epoxy group and quantitative method of carboxyl group, and also calculation of epoxy value and carboxyl value are conducted as mentioned below.

(3-1) Quantitative determination of epoxy group

Tetraethylammonium bromide (extra pure reagent), acetic acid (extra pure reagent), acetic anhydride (extra pure reagent) acetone (extra pure reagent), crystal violet indicator (100 mg was dissolved in 100 ml of acetic acid), 0.1N perchloric acid-acetic acid solution (reagent: factor=1.000), and tetraethylammonium bromide solution (prepared by dissolving 70 g of tetraethylammonium bromide in 500 ml of acetic acid and 500 ml of acetone) were provided.

2 g of the above-mentioned sample was accurately weighed and introduced into a 200 ml conical beaker, and 100 ml of tetraethylammonium bromide solution was added thereto. Thereafter, the sample was swollen at room temperature for 1 hour or more, and then titrated with 0.1N perchloric acid-acetic acid solution. Determination of the end point was conducted with a potentiometric titration automatic end point measuring instrument (trade name: AT-200$_N$) manufactured by Kyoto Electronics Manufacturing Industries Co., Ltd.

If the capacity (milliliter number) of 0.1N perchloric acid-acetic acid solution required for titration of the sample is ($V_1$) and weight (gram number) of the sample weighed is ($h_1$), the epoxy value (eq/kg) is represented by epoxy value=0.1$V_1$/$h_1$.

(3-2) Quantitative determination of carboxyl group 1,4-Doxane (extra pure reagent) and an 0.1N sodium hydroxide solution (reagent: factor=1.000) were provided.

2 g of the above-mentioned sample was weighed and introduced into a 200 ml conical beaker, and swollen with 50 ml of 1,4-dioxane at room temperature for 1 hour or more. 50 ml of distilled water was added, followed by titrating with an aqueous 0.1N sodium hydroxide soltuion. Determination of the end point was conducted with a potentiometric tiltration automatic end point measuring instrument (trade name: AT-200$_N$) manufactured by Kyoto Electronics Manufacturing Industries Co., Ltd. If the capacity (milliliter number) of 0.1N sodium hydroxide aqueous solution required for titration of the sample is ($V_2$), weight (gram number) of the sample weighed is ($h_2$), the carboxyl vlaue (eq/kg) is represented by carboxyl value=0.1$V_2$/$h_2$.

Test [4]: Discoloration property after heat curing

The above-mentioned sample was reacted in a hot air circulating oven at 180° C. for 20 minutes, and degree of discoloration (coloration) of the sample was visually determined. When discoloration is not observed, it is designated as r(3), when the sample slightly discolors, it is designated as r(2) and when sample discolors as a whole, it is designated as r(1), as is shown in Table 3 and Table 4. Discoloration property is improved in the order from r(1) to r(3).

Test [5]: Solvent resistance test (xylene rubbing)

A gauze dipped with xylene is reciprocated 20 times on the coating film surface, and scraping degree of the coating film by swelling or dissolution is observed. When there is not scraping due to swelling or dissolution, it is designated as r(4), when the surface shows slight scraping, it is designated as r(3), when scraping occurs, it is designated as r(2), and when scraping reached a substrate (steel plate), it is designated as r(1). The solvent resistance is improved in the order from r(1) to r(4).

Test [6]: Adhesion test of boiling water resistance (The test was conducted according to boiling water resistance and cross-cut adhesion test of general test method for coating material, JIS, K-5400).

The piece is dipped in boiling water for 1 hour. Water is shaken off, and the test piece is further placed in a room for 2 hours. Cross-cut form cuts are formed on the test piece using a cutter knife such that the distance of the space is 1.0 mm so as to form 100 columns. Cellophane tape was adhered so as to cover the cross-cuts, and then peeled slowly. In such a case, when cross-cuts do not peel at all, it is designated as r(4), when about 1 to 30 columns are peeled, it is designated as r(3), when about 31 to 70 columns are peeled, it is designated as r(2) and when at least 71 columns are peeled, it is designated as r(1), as is shown in Tables 3 and 4. The adhesion against boiling water is excellent in the order from r(1) to r(4).

The above-mentioned evaluation results are shown in Table 3 and Table 4.

TABLE 3

| Test No. | Example 1 | Example 2 | Example 3 | Example 4 | Example 5 |
|---|---|---|---|---|---|
| [1] | r(4) | r(4) | r(3) | r(4) | r(4) |
| [2] | r(4) | r(4) | r(4) | r(4) | r(4) |
| [3] | r(3) | r(3) | r(3) | r(3) | r(3) |
| [4] | r(3) | r(3) | r(3) | r(3) | r(3) |
| [5] | r(3) | r(3) | r(3) | r(4) | r(4) |
| [6] | r(4) | r(4) | r(4) | r(4) | r(4) |

TABLE 4

| Test No. | Comparative Example 1 | Comparative Example 2 | Comparative Example 3 | Comparative Example 4 | Comparative Example 5 |
|---|---|---|---|---|---|
| [1] | r(3) | r(4) | r(4) | r(4) | r(4) |
| [2] | r(1) | r(1) | r(1) | r(3) | r(4) |
| [3] | r(3) | r(3) | r(3) | r(3) | r(2) |
| [4] | r(3) | r(3) | r(3) | r(3) | r(3) |
| [6] | r(3) | r(4) | r(3) | r(4) | r(1) |

| Test No. | Comparative Example 6 | Comparative Example 7 | Reference Example 1 | Reference Example 2 |
|---|---|---|---|---|
| [1] | r(2) | r(1) | r(2) | r(2) |
| [2] | r(3) | r(2) | r(4) | r(4) |
| [3] | r(2) | r(1) | r(2) | r(2) |
| [4] | r(1) | r(1) | r(3) | r(3) |
| [6] | r(2) | r(2) | r(2) | r(2) |

The present invention is a composition having excellent weathering resistance as shown in the Examples. In the composition of (A+B+D) component shown in Examples 1 to 3 or the composition of (A+B+C+D) component shown in Examples 4 to 5, as compared with the composition of (A+B) component or the composition of (A+B+C) shown in the Reference Examples, the ring-opening polymerization of β-methylglycidyl groups each other (self-polymerization) is inhibited by adding the component (D), and β-methylglycidyl group and carboxyl group in the component (A) are reacted with good efficiency, causing curing. As a result, impact resistance of the cured product obtained is improved.

Further, as compared with the composition of (A+B+D) component shown in Examples 1 to 3, the composition of (A+B+C+D) component shown in Examples 4 to 5 further improves solvent resistance.

In the comparison between Example 4 and Example 5, the evaluation results are the same. However, if a compound (C2) that the component (C) in the composition of (A+B+C+D) component has β-methylglycidyl group rather than a compound (C1) having glycidyl group is used, the compound has good compatibility with the carboxyl group-containing resin of the component (A), has high stability to light and water, and has excellent reactivity in β-methylglycidyl compounds. Therefore, it is possible to sufficiently react with the carboxy group-containing resin of the component (A), and as a result, a coating film having most excellent weathering resistance is obtained.

INDUSTRIAL APPLICABILITY

The present invention can make a cured product having excellent weathering resistance since hydrolysis resistance of ester bond is improved by the effect of methyl group positioned at β-position by using an ester compound having β-methylglycidyl group in the component (B) or the component (C) to the carboxyl group-containing resin of the component (A).

The ester compound having β-methylglycidyl group tends to cause a ring-opening polymerization (self-polymerization) of β-methylglycidyl groups each other, but by using a ring-opening polymerization inhibitor of the component (D), β-methylglycidyl group and carboxyl group are efficiently reacted, and a cured product having excellent impact resistance and solvent resistance in addition to wearing resistance can be formed.

By utilizing each characteristics, the resin composition for powder coating of the present invention can widely be utilized in a room or outside a room, such as domestic electric products or outer walls.

We claim:

1. A resin composition for powder coating, comprising the following component (A), component (B) and component (D):

(A) a carboxyl group-containing resin having a number average molecular weight of 1000 to 20000, an acid value of 5 to 200 and a glass transition temperature of 30 to 120° C.;

(B) bis(β-methylglycidyl)terephthalate of the formula (1):

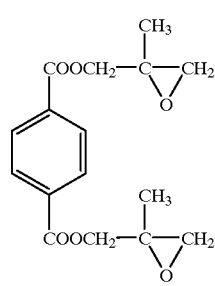

(1)

as a curing agent; and (D) at least one member selected from the group consisting of amines having the linkage of the formula (2):

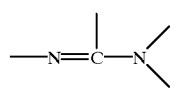

(2)

in the molecule, triarylphosphines and onium salts as a ring-opening polymerization inhibitor, said resin composition being compounded in the equivalent ratio of (β-methylglycidyl group in component (B))/(carboxyl group in component (A)) being 0.5 to 3.0.

2. The resin composition for powder coating as claimed in claim 1, wherein the amine having a bond of the formula (2) in the molecule as the component (D) is a cyclic amine having a structure of the formula (3):

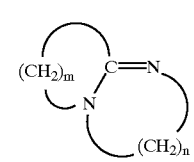

(3)

wherein m is a natural number of 2 to 11, and n is a natural number of 2 to 3.

3. The resin composition for powder coating as claimed in claim 1, wherein the amine having a bond of the formula (2) in the molecule as the component (D) is a guanidine derivative having a structure of the formula (4):

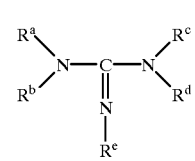

(4)

wherein $R^a$, $R^b$, $R^c$ and $R^d$ represent an alkyl group or an aryl group, and $R^e$ represents hydrogen atom, an alkyl group or an aryl group.

4. The resin composition for powder coating as claimed in claim 1, wherein said onium salts as the component (D) are quaternary ammonium salts having a structure of the formula (5):

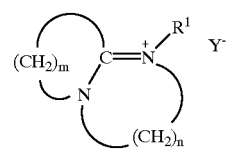

(5)

wherein m is a natural number of 2 to 11, and n is a natural number of 2 to 3, and $R^1$ represents an alkyl group or an aryl group and $Y^-$ represents an anion;

quaternary ammonium salts having a structure of the formula (6): $R^2R^3R^4R^5N^+Y^-$ wherein $R^2$, $R^3$, $R^4$ and $R^5$ represent an alkyl group or an aryl group, N represents nitrogen atom, $Y^-$ represents an anion, and each $R^2$, $R^3$, $R^4$ and $R^5$ are bonded with nitrogen atom through C—N bond;

quaternary ammonium salts having a structure of the formula (7):

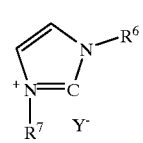

(7)

wherein $R^6$ and $R^7$ represent an alkyl group or an aryl group, and $Y^-$ represents an anion;

quaternary ammonium salts having a structure of the formula (8):

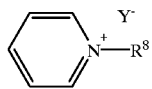

(8)

wherein R⁸ represents an alkyl group or an aryl group, and Y⁻ represents an anion;

quaternary ammonium salts having a structure of the formula (9):

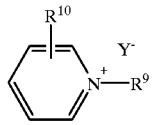

(9)

wherein R⁹ and R¹⁰ represent an alkyl group or an aryl group, and Y⁻ represents an anion;

tertiary ammonium salts having a structure of the formula (10);

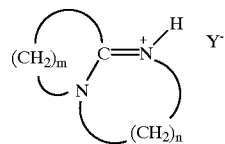

(10)

wherein m is a natural number of 2 to 11, and n is a natural number of 2 to 3, H represents hydrogen atom, and Y⁻ indicates an anion;

quaternary phosphonium salts having a structure of the formula (11): $R^{11}R^{12}R^{13}R^{14}P^+Y^-$ wherein each $R^{11}$, $R^{12}$, $R^{13}$ and $R^{14}$ represent an alkyl group or an aryl group, P represents phosphorus atom, Y⁻ represents an anion, and each $R^{11}$, $R^{12}$, $R^{13}$ and $R^{14}$ are bonded with phosphorus atom through C—P bond; and tertiary sulfonium salts having a structure of the formula (12): $R^{15}R^{16}R^{17}S^+Y^-$ wherein $R^{15}$, $R^{16}$ and $R^{17}$ represent an alkyl group or an aryl group, Y⁻ represents an anion, and each $R^{15}$, $R^{16}$ and $R^{17}$ are bonded with sulfur atom through C—S bond.

5. The resin composition for powder coating as claimed in claim 1, wherein said component (D) is at least one onium salt selected from the group consisting of the compounds of the formula (5), the compounds of the formula (7), the compounds of the formula (8), the compounds of the formula (9), the compounds of the formula (10), the compounds of the formula (11) and the compounds of the formula (12) as claimed in claim 4.

6. The resin composition for powder coating as claimed in claim 1, wherein the component (D) is contained in an amount of 0.01 to 10 parts by weight per 100 parts by weight of the component (A).

7. The resin composition for powder coating as claimed in claim 1, wherein the carboxyl group-containing resin of the component (A) is polyester resins, polyacrylic resin or their mixtures.

8. The resin composition for powder coating as claimed in claim 2, wherein the component (D) is contained in an amount of 0.01 to 10 parts by weight per 100 parts by weight of the component (A).

9. The resin composition for powder coating as claimed in claim 3, wherein the component (D) is contained in an amount of 0.01 to 10 parts by weight per 100 parts by weight of the component (A).

10. The resin composition for powder coating as claimed in claim 4, wherein the component (D) is contained in an amount of 0.01 to 10 parts by weight per 100 parts by weight of the component (A).

11. The resin composition for powder coating as claimed in claim 5, wherein the component (D) is contained in an amount of 0.01 to 10 parts by weight per 100 parts by weight of the component (A).

12. The resin composition for powder coating as claimed in claim 2, wherein the carboxyl group-containing resin of the component (A) is polyester resins, polyacrylic resin or their mixtures.

13. The resin composition for powder coating as claimed in claim 3, wherein the carboxyl group-containing resin of the component (A) is polyester resins, polyacrylic resin or their mixtures.

14. The resin composition for powder coating as claimed in claim 4, wherein the carboxyl group-containing resin of the component (A) is polyester resins, polyacrylic resin or their mixtures.

15. The resin composition for powder coating as claimed in claim 5, wherein the carboxyl group-containing resin of the component (A) is polyester resins, polyacrylic resin or their mixtures.

16. The resin composition for powder coating as claimed in claim 6, wherein the carboxyl group-containing resin of the component (A) is polyester resins, polyacrylic resin or their mixtures.

* * * * *